(No Model.)  2 Sheets—Sheet 1.

J. & W. GOODSON.
GAS REGULATOR.

No. 313,321.  Patented Mar. 3, 1885.

WITNESSES:
J. A. Rutherford
Robert Everett

INVENTORS:
John Goodson
William Goodson,
By James L. Norris.
Atty.

(No Model.) 2 Sheets—Sheet 2.
J. & W. GOODSON.
GAS REGULATOR.
No. 313,321. Patented Mar. 3, 1885.
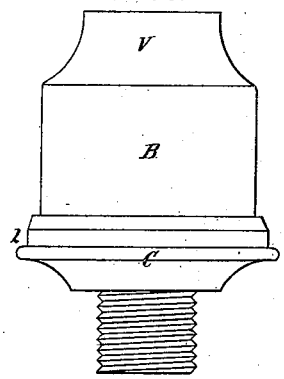
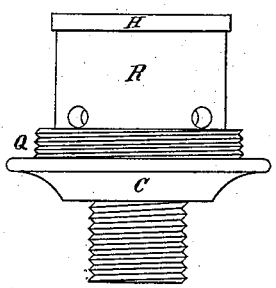
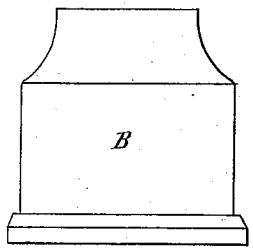
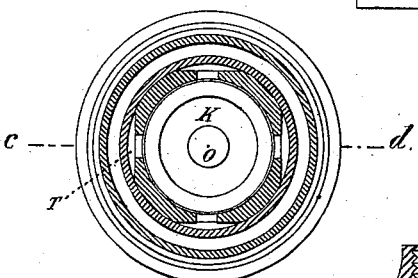
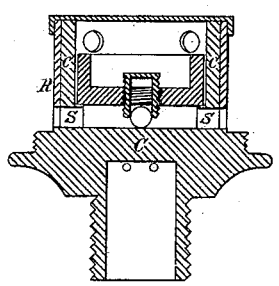
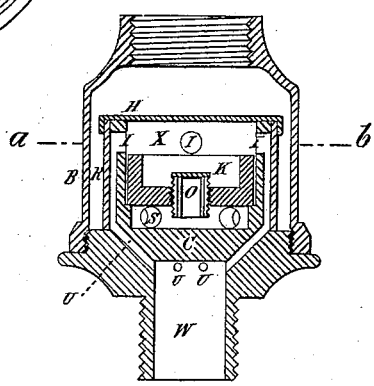
WITNESSES.
J. C. Rutherford
Robert Everett
INVENTORS.
John Goodson
William Goodson
By James L. Norris.
Atty.

UNITED STATES PATENT OFFICE.

JOHN GOODSON AND WILLIAM GOODSON, OF LONDON, ENGLAND.

GAS-REGULATOR.

SPECIFICATION forming part of Letters Patent No. 313,321, dated March 3, 1885.

Application filed September 18, 1884. (No model.) Patented in England April 7, 1883, No. 1,766.

*To all whom it may concern:*

Be it known that we, JOHN GOODSON and WILLIAM GOODSON, both of London, England, have invented new and useful improvements in gas-regulators, in the materials employed, and in the process or method of making a part of such regulators, (for which we have obtained a patent in Great Britain, No. 1,766, bearing date April 7, 1883,) of which the following is a specification, reference being had to the accompanying drawings.

This invention has reference to the construction of gas-regulators in such a manner as, while serving to regulate the gas admitted to a number of burners or other apparatus requiring a considerable supply, is specially adapted for application to single burners, in consequence of its thorough efficiency, even when made of very small size.

The invention consists in the novel construction and combination of devices hereinafter described and claimed, reference being made to the accompanying drawings, in which—

Figure 1:
Figure 2:
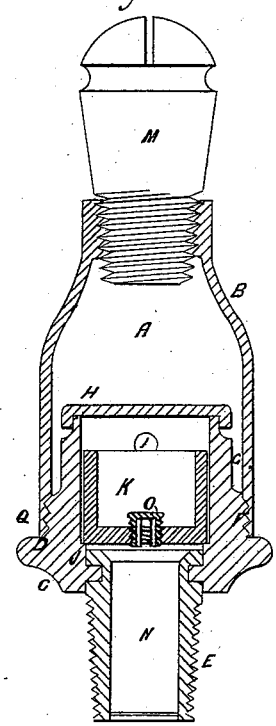
Figure 3:
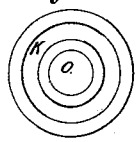
Figure 4:
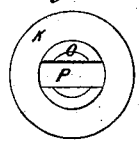
Figure 5:
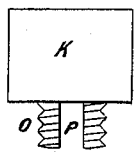
Figure 6:
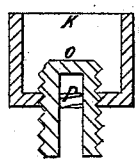
Figure 7:
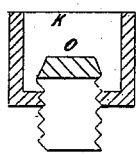

Figure 1 is an elevation of a gas burner and regulator constructed according to our invention; Fig. 2, a vertical central sectional view of the same on an enlarged scale; Figs. 3, 4, 5, 6, and 7, detail views of the regulating cap or cup, showing an adjusting-screw for controlling the orifice through the same to regulate the flow of the gas; Fig. 8, an elevation of a burner and regulator embodying a modification of the invention; Figs. 9 and 10, elevations of the lower and upper parts, respectively, of the burner shown in Fig. 8; Fig. 11, a transverse sectional view taken on the line *a b* of Fig. 13; Fig. 12, a vertical sectional view of Fig. 9, and Fig. 13 a vertical sectional view of Fig. 8.

It will be seen that the regulator consists of a hollow metallic case, A, made in two parts, B and C. The lower piece has a flange, D, about midway in its height. Below the flange the case is taper, and has an exterior screw, E, suitable for screwing the apparatus into an ordinary burner-socket. Above the flange it has also an exterior screw, F, by which the upper piece of the case B is attached to it. Above the screw on the lower piece the case is reduced in size so as to leave a space, G, between it and the interior of the upper piece. On the top of the lower piece is attached a closely-fitting metallic cap, H, and just beneath the cap are two or more holes, I, so as to allow of gas passing from the lower to the upper part of the case. Within the lower piece, which has an internal flange or projection, J, below the exterior flange, a cup or inverted cap, K, of meerschaum, vulcanite, ivory, or other suitable material, and having a hole in its center, is fitted with accuracy, but with sufficient freedom to allow of its sliding up and down. The upper piece of the case is provided with a burner, M, and the lower part of the upper piece has an internal screw for attaching it to the lower piece at Q.

The action of the apparatus is as follows: Assuming, for the sake of illustration, that it is desired that the burner shall consume five feet per hour with a minimum pressure of one inch, and that under any excess of pressure it shall consume no more, the cup is made of suitable weight and size, and on gas being admitted to N from below, as in an ordinary burner, at a pressure of one inch, it will flow through the hole in the bottom of the cup, and from thence, through the holes I in the lower part of the case to the upper part thereof, to the burner, where it will be consumed. If, however, there is an excess of pressure, the cup K will be raised so as to cover the holes I in the lower piece sufficiently to prevent more gas passing to the burner than it was contemplated to burn. The greater the pressure beneath the cup the higher it will rise, and so reduce in proportion the size of the passages for the gas to the burner. The size and weight of the cup are carefully designed, so that on any considerable and sudden increase of pressure sufficient to cause the cup to rise to the top of its chamber the gas will not be entirely shut off from the burner.

In Fig. 2 the cup K is shown simply with a hole through it, and cups so made may be used; but it is preferable to make the cup with a slitted screw, O, so that the size of the hole may be adjusted in accordance with the effect required.

The invention in the second place has reference to a modification of the foregoing, whereby the regulator may be applied to the upper part of suspension-light fittings. The arrangement will be understood by reference to Figs. 8, 9, 10, 11, 12, and 13 of the drawings.

It will be seen that this regulator is adapted to a fitting having a single burner, or to such as have a number of burners, and that, as in the former form, it consists of a body made in two principal parts, B and C, which are connected together by male and female screws at Q. The inner part of the body C is cast, and has a piece of triplet brass tube, R, which is slipped over the body C after the latter has been accurately turned, the one being fitted closely over the other. Two, three, four, or more or less holes, S, are drilled completely through the tube R and body C, each hole serving as a passage for the gas. The cup K is formed of the same shape, and occupies the same position as previously described. Above the cup K and just below the cap H two, three, four, or more holes, I, are drilled through the body C, and that part of the body extending from the top of each hole I to the offset for the male connecting-screw has a flat filed on it, so that when the piece of tube is slid over the body passages T for the gas are formed. A number of holes, U U, are also drilled through the lower part of the body of the case C, so as to form so many conduits for the gas and make the passage from the holes I to the outlet W of the regulator complete.

The action is as follows: The gas enters at V, passes down between the outer case, B, and tube R, through the holes S under the cup. From thence the gas rises through the adjustable and slitted screw O in the bottom of the cup into the chamber X, and then flows through the holes I down the passages T and holes U U to the outlet W. The regulation depends upon the arrangement and adjustment of the cup K, as hereinbefore described.

Having thus described our invention, what we claim is—

1. In a gas-regulator, the combination of the upper and lower sections, B and C, the latter having an interior chamber and a lateral orifice, I, a cover, H, closing the top of the chamber, an inverted cup, K, arranged to rise and fall in the chamber, and provided with a perforation, and the slotted screw O, adjustable in the said perforation, substantially as described.

2. The combination, in a gas-regulator, of the upper and lower sections, B and C, the latter having an interior chamber, perforations I and S, and conduits U, the tube R, surrounding the lower section and perforated at its base, and an inverted cup, K, arranged to rise and fall in the chamber of the lower section, and having a perforation and adjusting-screw, substantially as described.

In testimony whereof we have signed our names to this specification in the presence of two subscribing witnesses.

JOHN GOODSON.
WILLIAM GOODSON.

Witnesses:
W. H. BENNETT,
W. B. LAMPARD.